United States Patent [19]

Kosaka

[11] Patent Number: 4,916,540
[45] Date of Patent: Apr. 10, 1990

[54] SPECIAL EFFECT APPARATUS FOR VIDEO SIGNAL

[75] Inventor: Etsuko Kosaka, Tokyo, Japan

[73] Assignee: NEC Corporation, Japan

[21] Appl. No.: 143,409

[22] Filed: Jan. 13, 1988

[30] Foreign Application Priority Data

Jan. 14, 1987 [JP] Japan .................................. 62-5137

[51] Int. Cl.$^4$ .......................................... H04N 5/14
[52] U.S. Cl. ......................................... 358/160; 358/22
[58] Field of Search ........................... 358/160, 22, 13; 382/41, 44, 46

[56] References Cited

U.S. PATENT DOCUMENTS

| | | | |
|---|---|---|---|
| 4,472,732 | 9/1984 | Bennett et al. | 358/22 |
| 4,533,952 | 8/1985 | Normann, III | 358/160 |
| 4,563,703 | 1/1986 | Taylor et al. | 358/160 |
| 4,707,730 | 11/1987 | Alard | 358/13 |

FOREIGN PATENT DOCUMENTS 2129480 12/1971 Fed. Rep. of Germany .

Primary Examiner—James J. Groody
Assistant Examiner—David E. Harvey
Attorney, Agent, or Firm—Ostrolenk, Faber, Gerb & Soffen

[57] ABSTRACT

A special effect apparatus which is capable of producing a special effect image in which a speed of image transformation is changed as a function of location between a plurality of predetermined knots of the image. The special effect apparatus includes a read address generating circuit for generating a read-out address to read a stored digital video signal out of a video memory. The read address generating circuit includes a coefficient calculator for calculating coefficients defining a function of a tracing curve, which linearly connects the predetermined knots, a transition distance calculator for calculating a transition distance between the predetermined knots during a transition time, and an interpolated parameter calculator responsive to the calculated coefficients and the calculated transition distance, for calculating an interpolated parameter, based on parameters defined at the predetermined knots, such that the speed of image transformation between the knots varies in accordance with location between the predetermined knots, whereby the read address generator generates a read-out address in accordance with the interpolated parameter.

5 Claims, 4 Drawing Sheets

SPECIAL EFFECT APPARATUS FOR VIDEO SIGNAL

BACKGROUND OF THE INVENTION

This invention relates to a special effect apparatus for a video signal and more particularly to a special effect apparatus which produces a special effect image in which image transformation is changed through a plurality of predeterminedly designated knots at which respective transformation parameters are previously designated.

A special effect apparatus of this kind is disclosed in U.S. Pat. No. 4,468,688 "Controller For System For Spatially Transforming Images", for example. In such conventional special effects apparatus, image transformation can be linearly shifted from one knot to another knot by calculating interpolated parameters between the knots. However, according to the conventional special effect apparatus, it is impossible to produce a special effect image in which a speed of image transformation on a tracing curve through knots varies in accordance with a position between the knots.

SUMMARY OF THE INVENTION

It is, therefore, an object of the present invention to provide a special effect apparatus for a video signal which produces a new special effect image in which a speed of image transformation between previously designated knots can vary in accordance with a position between the previously designated knots.

According to the present invention, there is provided a special effect apparatus which comprises an A/D converter for converting an input analog video signal into a digital video signal, a video memory, a write address generating circuit for generating a write-in address to store the digital video signal in the video memory, a read address generating circuit for generating a read-out address to read out a stored digital video signal from the video memory with special effect image transformation and a D/A converter for converting the read-out digital video signal into an analog video signal, the read address generating circuit including a coefficient calculator for calculating coefficients defining a function of a tracing curve which linearly connects a plurality of predeterminedly designated knots, a transition distance calculator for calculating a transition distance between the predeterminedly designated knots during a transition time, and an interpolated parameter calculator responsive to the calculated coefficients and the calculated transition distance for calculating an interpolated parameter from parameters defined at the predeterminedly designated knots, whereby the read address generator generates a read-out address in accordance with the interpolated parameter.

DETAILED DESCRIPTION OF A PREFERRED EMBODIMENT

Figure 1:
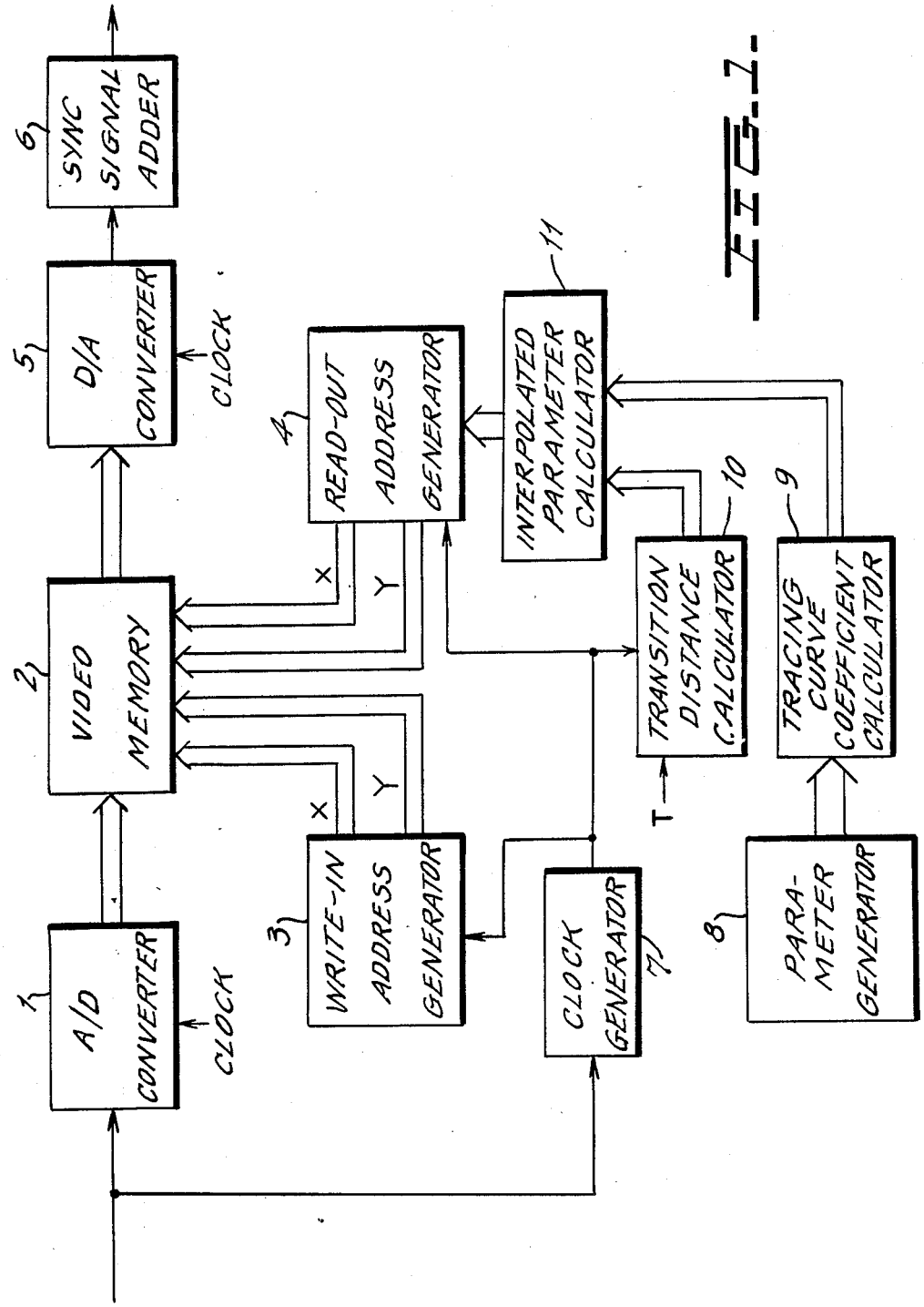
FIG. 1 shows a block diagram of an embodiment according to the present invention.

Referring to FIG. 1 showing an embodiment of the present invention, an input analog television video signal is converted into a digital video signal by an A/D converter 1 and the digital video signal is stored into a video memory 2 in accordance with a write-in address generated by a write address generator 3. The stored digital signal is read out from the video memory 2 in accordance with a read-out address generated by a read address generator 4 and converted into analog video signal by a D/A converter 5. A sync signal adder 6 adds a standard synchronizing signal to the analog video signal delivered from the D/A converter 5. In this embodiment, a clock generator 7 generates a clock signal having a predetermined frequency, for example, four times the subcarrier frequency, and supplies it to the address generators 3 and 4 and other circuits to provide a calculation timing.

In order to produce a special effect image, the read address generator 4 generates a read-out address in the following manner: In accordance with desired transformation factors, the product of respective matrices such as a scaling transformation matrix, a positioning transformation matrix, a rotation transformation matrix and a perspective transformation matrix, associated with the respective factors, is calculated; in inverse matrix of the product is obtained; and an address of each picture element is multiplied by the obtained inverse matrix so as to generate a read-out address.

In order to generate such read out address, the read address generator 4 is controlled by a combination of a parameter generator 8, a tracing curve coefficient calculator 9, a transition distance calculator 10 and an interpolated parameter calculator 11.

In FIG. 1, the parameter generator 8 generates sets of parameters of respective transformation factors and each set of parameters is predeterminedly defined at each designated knot. As described above, the parameters are associated with respective factors such as scaling, positioning, rotation and perspective. The parameters defined at a plurality of designated knots are supplied from the parameter generator 8 to a tracing curve coefficient calculator 9, and coefficients defining a function of a tracing curve, which linearly connects a plurality of designated knots, are calculated. On the other hand, a transition distance calculator 10 calculates a transition distance between two adjacent designated knots. Then, an interpolated parameter calculator 11 calculates an interpolated parameter of each factor between the two adjacent designated knots. The read-out address generator 4 generates the read-out address by utilizing the interpolated parameter between the two adjacent designated knots.

The operation of the tracing curve coefficient calculator 9 FIG. 3, the transition distance calculator 10 FIG. 4 and the interpolated parameter calculator 11 FIG. 6 will be described in detail hereinafter.

Figure 2:
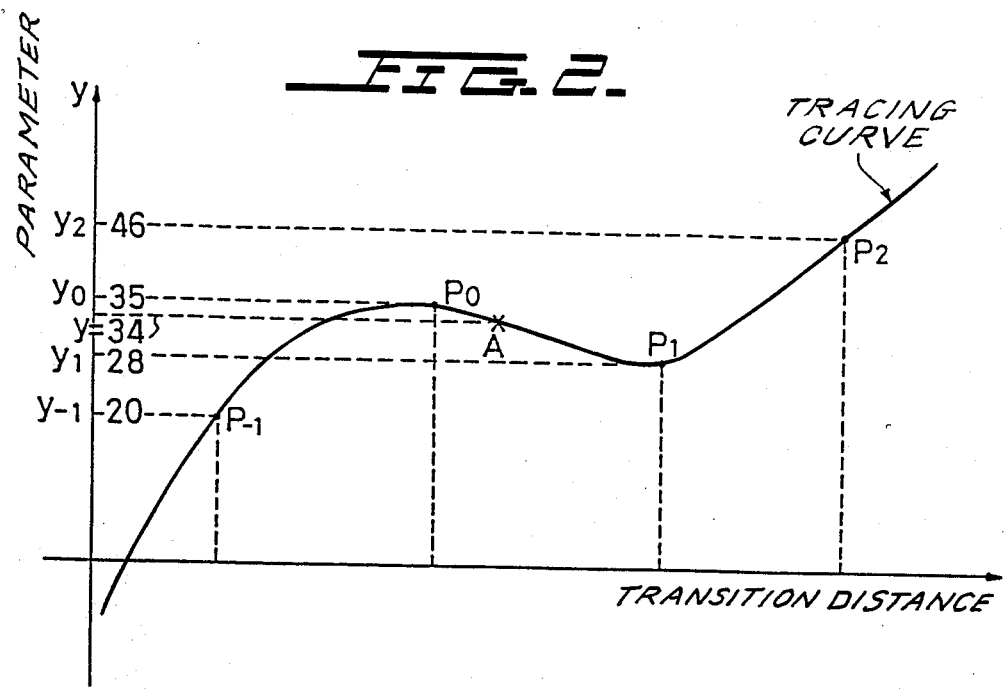
FIG. 2 is a chart showing a plurality of predeterminedly designated knots and a tracing curve which linearly connects the previously designated knots.

In the description, only a parameter of positioning transformation is selected for explanation, for example, and, further, only one coordinate component in the positioning parameter will be explained by referring to FIG. 2. In FIG. 2, a vertical axis corresponds to a value of the positioning parameter of one coordinate component and a horizontal axis corresponding to a transition distance. Four knots $P_{-1}$, $P_0$, $P_1$ and $P_2$ are previously designated and four parameters $y_{-1}$, $y_0$, $y_1$ and $y_2$ of the one coordinate component are given in accordance with the four knots $P_{-1}$, $P_0$, $P_1$ and $P_2$.

The tracing curve coefficient calculator 9 calculates the following coefficients a, b, c and d in response to the parameters $y_{-1}$, $y_0$, $y_1$ and $y_2$:

$$a = \frac{y_2 - 3y_1 + 3y_0 - y_{-1}}{2}$$

$$b = -\frac{y_2 - 4y_1 + 5y_0 - y_{-1}}{2}$$

$$c = \frac{y_1 - y_{-1}}{2}$$

$$d = y_0$$

Figure 3:
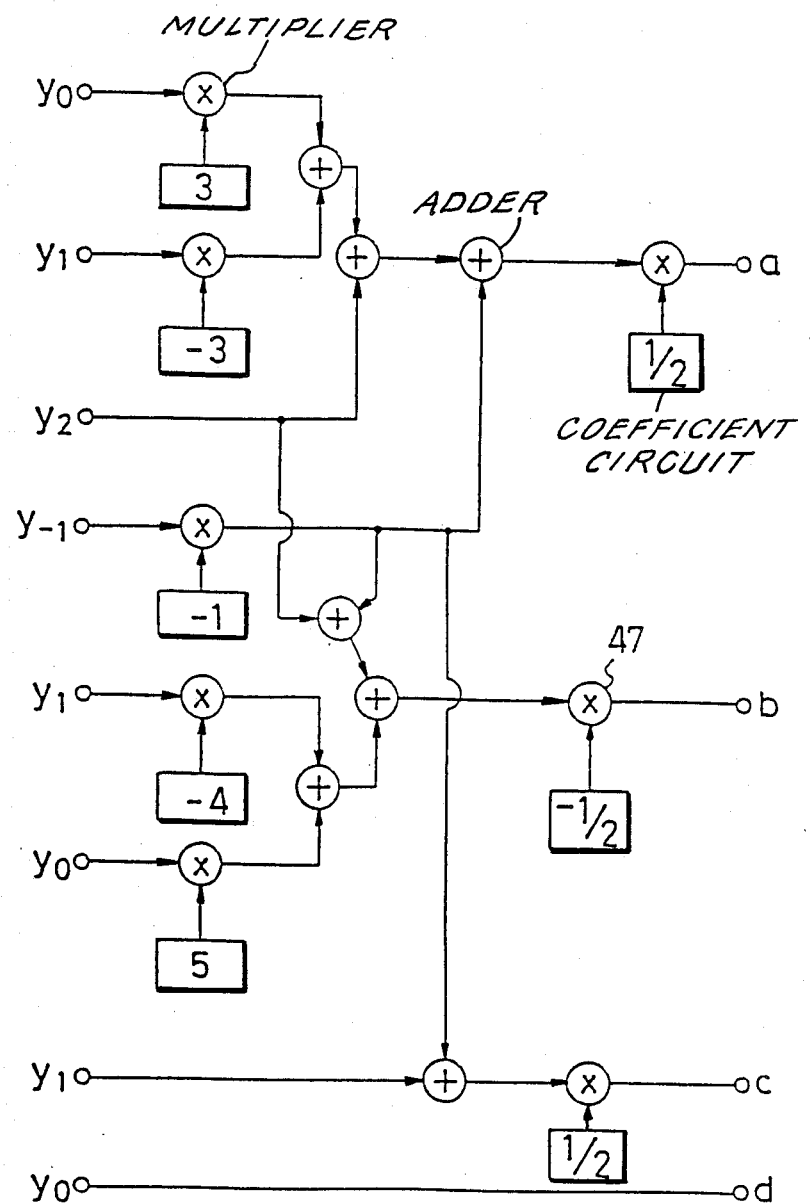
FIG. 3 is a block diagram of a coefficient calculator shown in FIG. 1.

Such tracing curve coefficient calculator 9 comprises a plurality of multipliers, a plurality of adders and a plurality of coefficient circuits, for example, which are connected as shown in FIG. 3. In this case, it means that a tracing curve defined by a function y $(=az^3+bz^2+cz+d)$ connects the four knots $P_{-1}$, $P_0$, $P_1$ and $P_2$ as shown in FIG. 2. Further, z corresponds to the transition distance between two adjacent designated knots and, particularly, z is expressed by a ratio of a transferred distance on the tracing curve up to the present time, to the entire distance on the tracing curve between the two adjacent designated knots. Therefore, a range of z is defined by ($0 \leq z \leq 1$).

Figure 5:
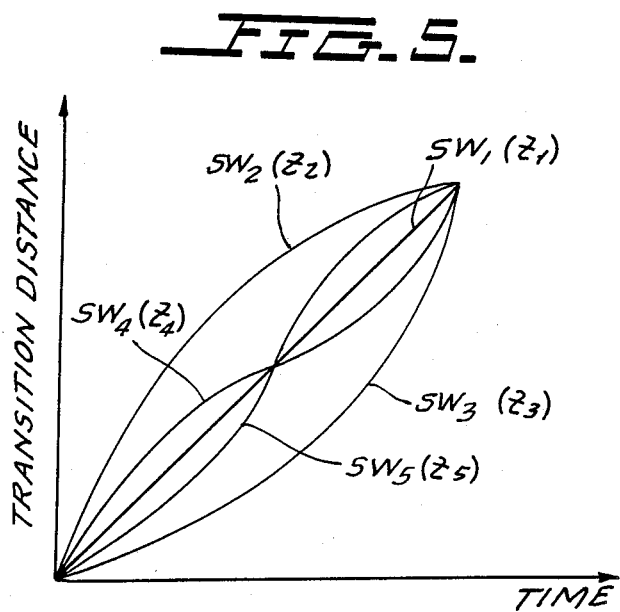
FIG. 5 is a chart showing various speed modifications obtained by the transition distance calculator of FIG. 4.
Figure 4:
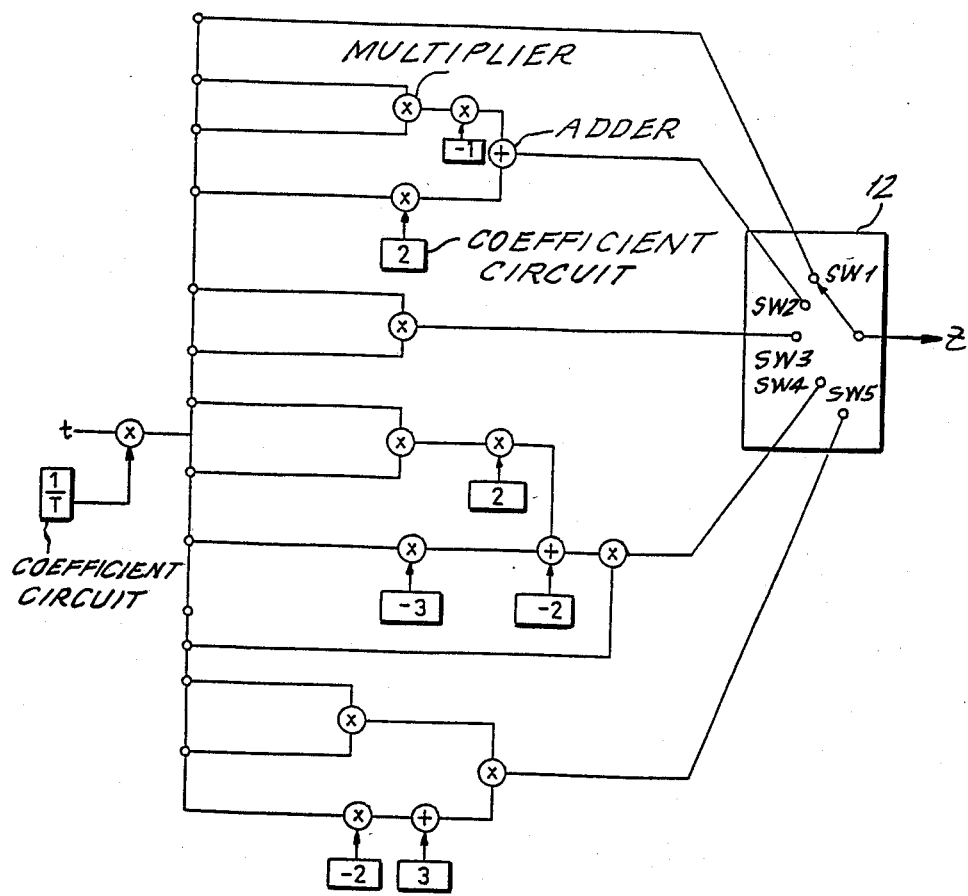
FIG. 4 is a block diagram of a transition distance calculator shown in FIG. 1.

In order to produce the forementioned "z", the transition distance calculator 10 comprises, as shown in FIG. 4, a plurality of multipliers, a plurality of adders, a plurality of coefficient circuits and a selector 12, which are connected as shown. In the embodiment, the five following functions of z are provided:

$$z_1 = r$$

$$z_2 = r(2-r)$$

$$z_3 = r^2$$

$$z_4 = r(2r^2 - 3r - 2)$$

$$z_5 = r^2(3-2r)$$

where: $r = t/T$; T indicates a predetermined transition time from one designated knot to another adjacent designated knot; and t indicates an elapsed time up to the present time from one knot. FIG. 5 shows characteristics of the five forementioned functions. In accordance with selection of $SW_1$ to $SW_5$ in the selector 12, one of the five following functions $z_1$ to $z_5$ can be selected.

The interpolated parameter calculator 11 shown in FIG. 1 calculates interpolated data y $(=az^3+bz^2+cz+d)$ and supplies the calculated data y to the read-out address generator 4 (FIG. 1).

Figure 6:
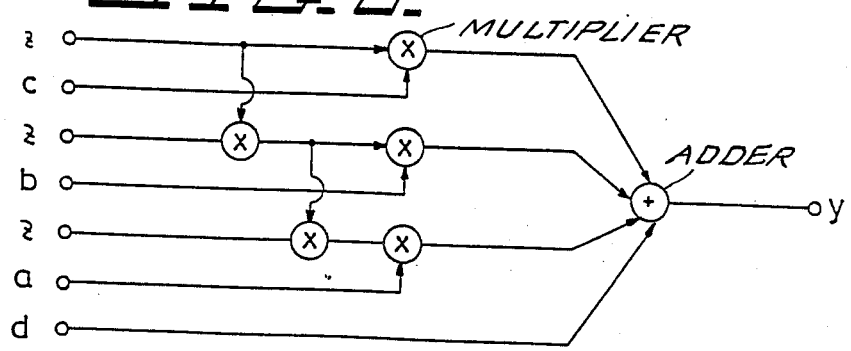
FIG. 6 is a block diagram of an interpolated parameter calculator shown in FIG. 1.

In order to produce the forementioned interpolated data y, the interpolated parameter calculator 11 comprises, as shown in FIG. 6, a plurality of multipliers and an adder, which are connected as shown.

In FIG. 2, it is assumed that the transition time T from $P_0$ to $P_1$ and the elapsed time t are designated to 60 television fields (one second) and 30 television fields, respectively, and, in FIG. 4, the switch $SW_3$ for the function $(z=r^2)$ is selected from the selector 12. Further, the parameters $y_{-1}$, $y_0$, $y_1$ and $y_2$ are designated equal to 20, 35, 28 and 46 respectively. In this case, $z = r^2 = 0.25$, and the coefficients a, b, c and d are 23.5, 44.5, c=4 and d=35, respectively. Therefore, the interpolated parameter y becomes 34. The parameter y is calculated as follows:

$$y = az^3 + bz^2 + cz + d$$

$$y = 23.5z^3 - 44.5z^2 + 4z + 35$$

$$y = 23.5 \times (0.25)^3 - 44.5 \times (0.25)^2 + 4 \times 0.25 + 35$$

$$y = 33.6$$

$$y = 34.$$

Accordingly, in FIG. 2, the interpolated parameter y (34) at a point A on the tracing curve between the knots $P_0$ and $P_1$, which is located at ¼ distance from the knot $P_0$, is obtained. Similarly, all interpolated parameters y between the knots can be obtained in accordance with the input data t.

In the embodiment, the interpolation process is explained with regard to only the positioning parameter, and particularly, with regard to one coordinate component. However, it is apparent that other parameters of scaling, rotation and perspective factors, for example, can be similarly processed to compute interpolated parameters between knots.

As described above, according to the present invention, the special effect apparatus capable of modifying the transition speed of image transformation on the tracing curve through predeterminedly designated knots is realized by independently calculating coefficients of the tracing curve function and the transition speed.

What is claimed is:

1. A special effect apparatus comprising
   an A/D converter for converting an input analog video signal into a digital video signal,
   a video memory means,
   a write address generating means for generating a write-in address to store said digital video signal in said video memory means,
   a read address generating means for generating a read-out address to read out a stored digital video signal from said video memory means, and
   a D/A converter for converting a read-out digital video signal from said video memory means into an analog video signal,
   said read address generating means including:
   means for generating parameters associated with a desired image transformation, said parameters being predetermined at a plurality of knots on a video image;
   means coupled to said parameter generating means for calculating coefficients defining a tracing curve in accordance with said parameters, said tracing curve being constructed by connecting said plurality of knots;
   means for sequentially calculating a transition distance on said tracing curve between two knots among said plurality of knots according to a predetermined function, said transition distance varying non-linearly as a function of a time lapse;
   means coupled to said coefficient calculating means and said transition distance calculating means for calculating an interpolated parameter, said interpolated parameter determining an image transformation between said two knots; and means coupled to said interpolated parameter calculating means for generating said read-out address.

2. A special effect apparatus as claimed in claim 1, wherein said transition distance calculating means includes a plurality of function producing circuits corresponding to at least a quadratic function and a cubic function for calculating respective transition distances, and a selector for selecting one of said plurality of function producing circuits to determine said predetermined function.

3. A reading address producing arrangement for supplying a reading addres to a video memory storing a video signal to produce a desired image transformation, comprising:

means for predetermining parameters at a plurality of knots on a video image, a transition of said parameters through said plurality of knots corresponding to said desired image transformation;

means for calculating a tracing curve connecting said plurality of knots wherein said calculating means delivers coefficients, said coefficents defining said tracing curve;

means for calculating a distance ratio which is representative of the ratio of a transition distance to an entire distance between two knots on said tracing curve, said distance ratio varying according to a function which is selected from at least a quadratic function and a cubic function;

means responsive to said coefficients and said distance ratio for calculating an interpolated parameter between said two knots; and means responsive to said interpolated parameter for generating said reading address.

4. A special effect apparatus as claimed in claim 2, wherein said plurality of function producing circuits calculate said respective transition distances according to at least the functions:

$$Z=r(2-r),$$

$$Z=r^2,$$

$$Z=r(2r^2-3r-2) \text{ and}$$

$$Z=r^2(3-2r),$$

wherein $r=t/T$; T corresponds to a predetermined transition time between said two knots; and t indicates an elapsed time.

5. A special effect apparatus as claimed in claim 4, wherein said coefficient calculating means calculates coefficients a, b, c and d in response to parameters $Y_{-1}$, $Y_0$, $Y_1$ and $Y_2$ which are predetermined at a plurality of knots, wherein;

$$a = \frac{Y_2 - 3Y_1 + 3Y_0 - Y_{-1}}{2}$$

$$b = -\frac{Y_2 - 4Y_1 + 5Y_0 - Y_{-1}}{2}$$

$$c = \frac{Y_1 - Y_{-1}}{2}$$

$$d = Y_0,$$

said interpolated parameter calculating means calculates said interpolated parameter Y, wherein $$Y=az^3+bz^2+cz+d.$$

* * * * *